: US 11,695,694 B2

(12) United States Patent
Lancerica et al.

(10) Patent No.: US 11,695,694 B2
(45) Date of Patent: Jul. 4, 2023

(54) REDUCTION OF THE ATTACK SURFACE IN A COMMUNICATIONS SYSTEM

(71) Applicants: RENAULT s.a.s., Boulogne-Billancourt (FR); NISSAN MOTOR CO., LTD., Yokohama (JP)

(72) Inventors: Laurent Lancerica, Toulouse (FR); Jean-Baptiste Mange, Guyancourt (FR); Redouane Soum, Saint andre de la roche (FR)

(73) Assignees: RENAULT s.a.s., Boulogne-Billancourt (FR); NISSAN MOTOR CO., LTD., Yokohama (JP)

( * ) Notice: Subject to any disclaimer, the term of this patent is extended or adjusted under 35 U.S.C. 154(b) by 106 days.

(21) Appl. No.: 17/436,786

(22) PCT Filed: Mar. 12, 2020

(86) PCT No.: PCT/EP2020/056666
§ 371 (c)(1),
(2) Date: Sep. 7, 2021

(87) PCT Pub. No.: WO2020/187689
PCT Pub. Date: Sep. 24, 2020

(65) Prior Publication Data
US 2022/0174007 A1 Jun. 2, 2022

(30) Foreign Application Priority Data
Mar. 15, 2019 (FR) ..................... 19 02678

(51) Int. Cl.
*H04L 12/28* (2006.01)
*H04L 45/00* (2022.01)
(Continued)

(52) U.S. Cl.
CPC .......... *H04L 45/66* (2013.01); *H04L 63/0272* (2013.01); *H04L 67/12* (2013.01); *H04L 69/16* (2013.01)

(58) Field of Classification Search
CPC ..... H04L 29/06; H04L 45/66; H04L 63/0272; H04L 67/12; H04L 69/16; H04L 47/2475;
(Continued)

(56) References Cited

U.S. PATENT DOCUMENTS 10,819,418 B2 * 10/2020 Olive ..................... H04L 69/16
2003/0231632 A1 * 12/2003 Haeberlen ............... H04L 69/12
370/395.5

(Continued)

FOREIGN PATENT DOCUMENTS

EP 3 240 256 A1 11/2017
WO WO 2014/091148 * 6/2014

OTHER PUBLICATIONS

International Search Report dated May 20, 2021 in PCT/EP2020/056666, 2 pages
(Continued)

*Primary Examiner* — Frank Duong
(74) *Attorney, Agent, or Firm* — Oblon, McClelland, Maier & Neustadt, L.L.P.

(57) ABSTRACT

A system and a method are for routing data packets from or to at least one electronic control unit, referred to as outgoing packets or incoming packets respectively. The at least one electronic control unit is connected to a communications system via a first interface. The communications system is connected via a second interface to a modem suitable for transferring the outgoing packets and the incoming packets to or respectively from at least one telecommunications network through a plurality of access points. Each access point is secured or unsecured. The outgoing and incoming packets are processed according to the type of access point by which the packets are transferred to or from the at least one telecommunications network.

8 Claims, 5 Drawing Sheets

Figure 1:
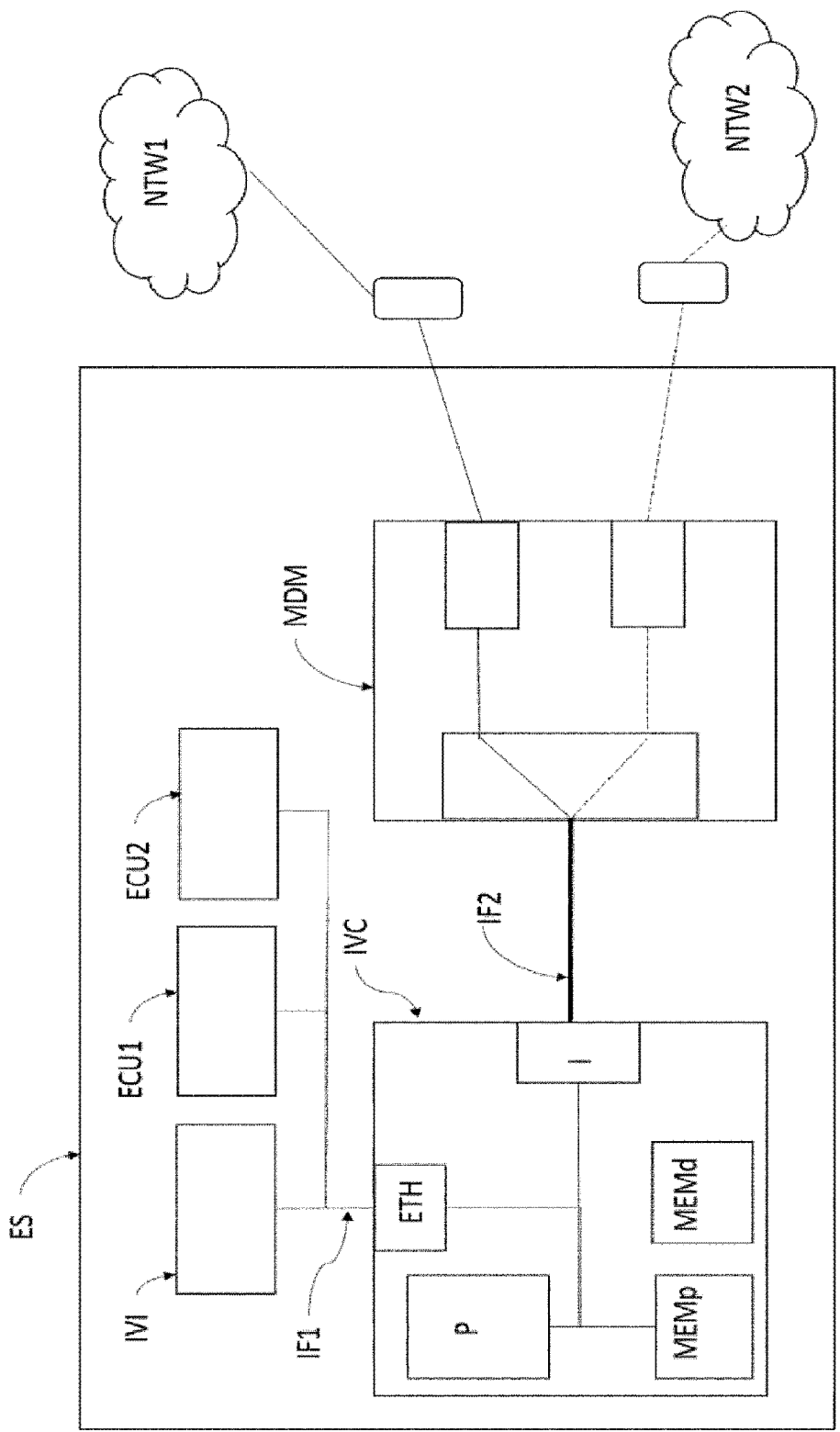

(51) Int. Cl.
*H04L 9/40* (2022.01)
*H04L 67/12* (2022.01)
*H04L 69/16* (2022.01)

(58) Field of Classification Search
CPC ... H04L 47/193; H04L 63/0209; H04L 63/20; H04L 69/18; H04L 2012/40273; H04L 12/46; H04W 12/121
See application file for complete search history.

(56) References Cited

U.S. PATENT DOCUMENTS

| | | | |
|---|---|---|---|
| 2009/0170475 A1* | 7/2009 | Ch'ng | H04W 12/02 455/411 |
| 2013/0201316 A1 | 8/2013 | Binder et al. | |
| 2017/0078400 A1 | 3/2017 | Binder et al. | |
| 2017/0317975 A1 | 11/2017 | Olive et al. | |
| 2017/0324817 A1* | 11/2017 | Oliveira | H04L 67/52 |
| 2017/0331899 A1 | 11/2017 | Binder et al. | |
| 2018/0034912 A1 | 2/2018 | Binder et al. | |
| 2018/0124181 A1 | 5/2018 | Binder et al. | |
| 2018/0278693 A1 | 9/2018 | Binder et al. | |
| 2018/0278694 A1 | 9/2018 | Binder et al. | |
| 2018/0343304 A1 | 11/2018 | Binder et al. | |
| 2018/0375940 A1 | 12/2018 | Binder et al. | |
| 2019/0098090 A1 | 3/2019 | Binder et al. | |
| 2019/0109904 A1 | 4/2019 | Binder et al. | |

OTHER PUBLICATIONS

Jan Lastinec et al., "Comparative Analysis of TCP/IP Security Protocols for Use in Vehicle Communication", 2016 17$^{th}$ International Carpathian Control Conference (/CCC), XP032917148, IEEE, May 29, 2016, pp. 429-433.

International Search Report and Written Opinion dated May 20, 2020 in PCT/EP2020/056666, (with Translation of Category of Cited Documents), 12 pages.

* cited by examiner

REDUCTION OF THE ATTACK SURFACE IN A COMMUNICATIONS SYSTEM

The invention relates to the field of transfers of data within wireless communications systems, and more particularly data transfer security implemented by communications equipment.

One of the problems of IT security is the introduction into an IT system software environment of non-approved programs. All the access points through which an unauthorized user can introduce such programs into an IT system are known as the "attack surface" of the system. Such access points are, for example, access points for services of various layers of a communication protocol stack, in particular the TCP/IP (Transmission Control Protocol/Internet Protocol) layer. Reducing the attack surface of an IT system is a significant security measure.

Vehicles are becoming increasingly complex and comprise a growing number of electronic control units, in order to provide more features to the end user. These electronic control units are equipped with communication interfaces, to establish directly or indirectly links with remote IT systems, via telecommunications networks, thus enabling vehicles to become "connected", but introducing a new potential threat of cyber attack.

In some architectures, the electronic control units of a vehicle access the wide area telecommunications networks, for example the Internet, via a communications system having an RF (Radiofrequency) modem that is suitable for establishing communications with these wide area telecommunications networks. Thus, the communications system performs both data transfers related to its own applications and data transfers between the other electronic control units of the vehicle and the wide area telecommunications networks. The communications system and the electronic control units are interconnected within a local area network, and the communications system redirects the data streams from and to electronic control units in accordance with the addresses allocated to these units in the local area network and in accordance with the source and destination addresses of the data packets.

In conventional systems, redirection takes place by the communications system providing access to the wide area telecommunications networks, by virtue of a technique called Network Address Translation (NAT), which is implemented in the TCP/IP layer of a protocol stack being executed in the software environment of said communications system. In that case, a data stream received from a wide area network must be processed by the TCP/IP protocol stack executed by the communications system, even if the latter is not the recipient of the data. Thus, unauthorized data can be introduced into the software environment of the communications system.

Certain data streams, for example multimedia content, are not routinely secure, and their handling by the TCP/IP protocol stack of the communications system could create security vulnerabilities, but rejecting them could lead to a poor user experience. Thus, there exists a need to ensure data transfers between the various electronic control units and the wide area telecommunications networks, without exposing the communications system to cyber attacks.

There is known from the document CN101127698 B a system and a method for achieving service-based routing selection, and requiring an identification of the data stream, which assumes the involvement of the upper layers of protocol stack.

Therefore, there exists a need to be able to route data between the wide area telecommunications networks and the electronic control units of the vehicle, not requiring the stream to be identified beforehand by examining the data, while preserving the security of the software environment of the communications system.

An aim of the present invention is to address the above-mentioned drawbacks of prior art.

To this end, a first aspect of the invention relates to a method for routing data packets coming from or going to at least one electronic control unit, referred to as outgoing packets, respectively incoming packets, said at least one electronic control unit being connected to a communications system via a first interface, said communications system being connected via a second interface to a modem suitable for transferring said outgoing packets and said incoming packets to, respectively from, at least one telecommunications network via a plurality of access points, each access point being of the secure or non-secure type, and being associated with an electronic control unit, the method being executed by the communications system and comprising:
  an incoming processing step; and/or
  an outgoing processing step.

The incoming processing step comprises:
  a first reception step for receiving, via the second interface, an incoming packet and an identifier of an access point via which said incoming packet has been received by the modem from said telecommunications network, referred to as reception access point;
  a first determination step for determining a type for the reception access point. If said reception access point is of the non-secure type, the method then comprises a first identification step for identifying an electronic control unit corresponding to the reception access point, referred to as recipient unit, and a first transfer step for transferring said incoming packet to the recipient unit at a data link layer of a TCP/IP protocol stack, via the first interface, without involving the TCP/IP layer. If said reception access point is of the secure type, the method then comprises a first internal processing step for the processing of said incoming packet by a TCP/IP telecommunications protocol stack executed by the communications system.

The outgoing processing step comprises:
  a second reception step for receiving via the first interface an outgoing packet from an electronic control unit, referred to as source unit;
  a second identification step for identifying an access point corresponding to the electronic source unit, referred to as transmission access point;
  a second determination step for determining a type for the transmission access point. If said transmission access point is of the non-secure type, the method then comprises a second transfer step for transferring said outgoing packet and an identifier of said transmission access point at a data link layer of a TCP/IP protocol stack, to the modem, via the second interface, without involving the TCP/IP layer of said stack. If said transmission access point is of the secure type, the method then comprises a second internal processing step for the processing of said outgoing packet by a TCP/IP telecommunications protocol stack executed by the communications system.

According to preferred embodiments, the invention comprises one or more of the following features which can be used separately or partly combined with each other or totally combined with each other.

The first interface comprises a data transmission physical layer and a plurality of logic layers to implement at least a part of a secure virtual network comprising a secure access point, and to implement a point-to-point local area network implementing a data link layer between said at least one electronic control unit and said communications system. The first transfer step comprises a first substep for adding a header, in accordance with the data link layer, to said incoming packet; and/or the second transfer step comprises a second substep for adding a header, in accordance with the data link protocol between said communications system and said modem, to said outgoing packet.

The first transfer step can comprise a first substep confirming acceptance of said incoming packet.

In a preferred embodiment,
the at least one telecommunications network is a communications network with mobile communication equipment;
the first internal processing step and/or second internal processing step comprises a first, respectively second, substep of address translation, NAT, between the at least one telecommunications network and the part of the secure virtual network; and
the first interface is an Ethernet interface.

The invention relates also to a computer program including instructions which, when executed by a processor of a computing system, bring about the implementation of a data packet routing method as described previously.

The invention relates also to a communications system suitable for being connected
via a first interface to at least one electronic control unit; and
via a second interface to a modem suitable for transferring data packets from or to said at least one electronic control unit, referred to as outgoing packets, respectively incoming packets, to, respectively from, at least one telecommunications network via a plurality of access points, each access point being of the secure or non-secure type, and being associated with an electronic control unit.

Said communications system additionally comprises:
first reception means for receiving from said at least one electronic control unit, referred to as source unit, an outgoing packet;
identification means for identifying an access point corresponding to the electronic source unit, referred to as transmission access point;
second reception means for receiving from the modem an incoming packet and an identifier of an access point via which said incoming packet has been received by the modem from said telecommunications network, referred to as reception access point;
determination means for determining a type for the transmission access point and/or reception access point;
transfer means for transferring at a link layer of a TCP/IP protocol stack, without involving the TCP/IP layer of said stack,
said outgoing packet and the identifier of said transmission access point to the modem if the transmission access point type is non-secure;
said incoming packet to the recipient unit if the reception access point type is non-secure;
internal processing means for the processing of said incoming packet and/or said outgoing packet by a TCP/IP telecommunications protocol stack, if the reception access point type is secure.

Another aspect of the invention relates to mobile communications equipment comprising a communications system as described previously, and at least one electronic control unit, which are connected via a first interface of the shared memory, Ethernet, USB or CAN type.

The invention relates also to a vehicle comprising communications equipment as described previously.

Other features and advantages of the present invention will become clearer upon reading the following detailed description given by way of example and not at all limiting, and illustrated by the accompanying drawings in which:

FIG. 1 schematically represents an example of wireless communications equipment able to implement the invention.

Figure 2:
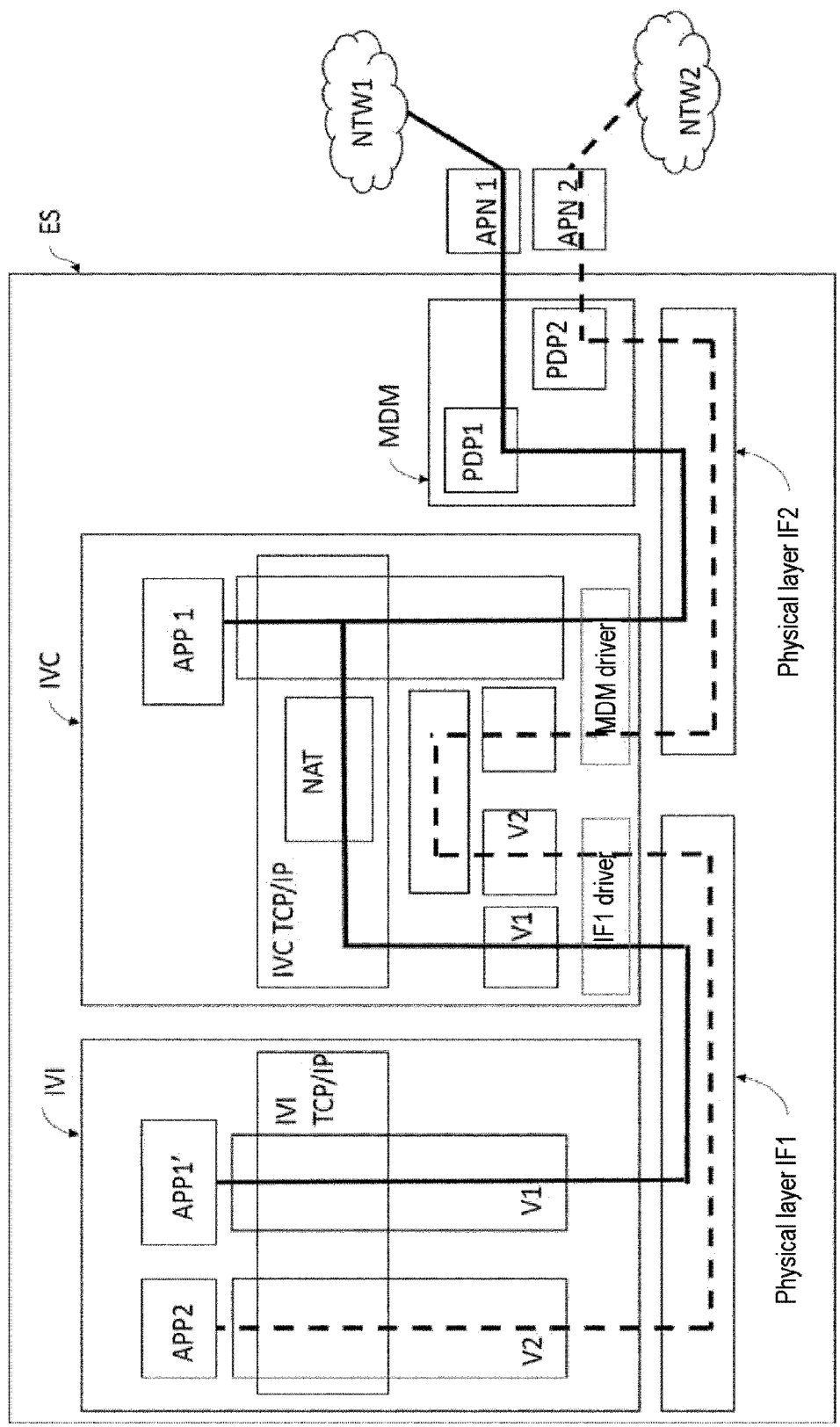

FIG. 2 schematically represents the architecture of wireless communications equipment able to implement the invention.

Figure 3:
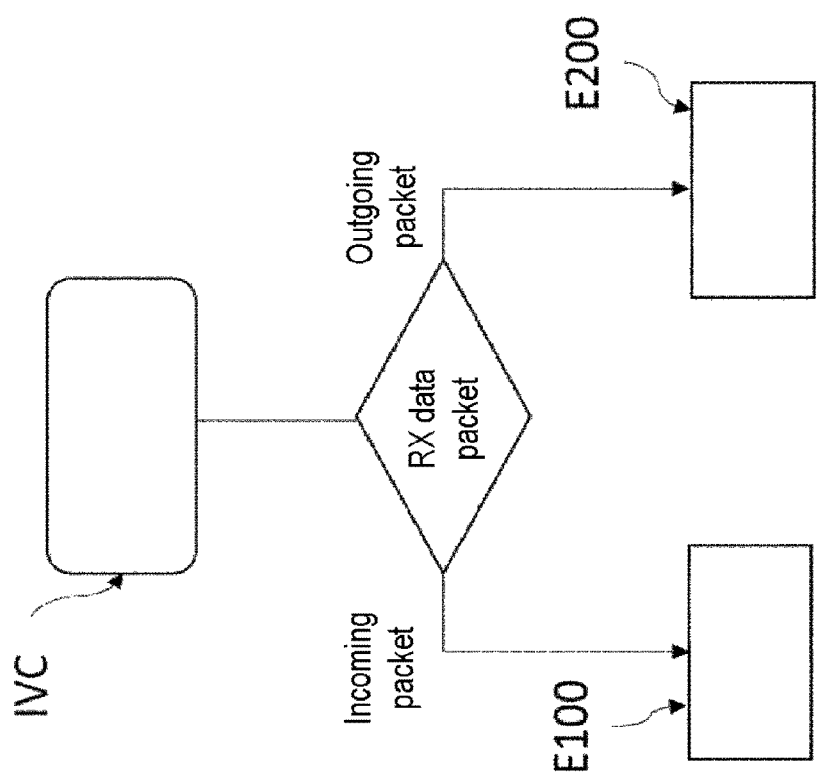

FIG. 3 schematically represents the steps of a data packet routing method, according to an embodiment of the invention.

Figure 4:
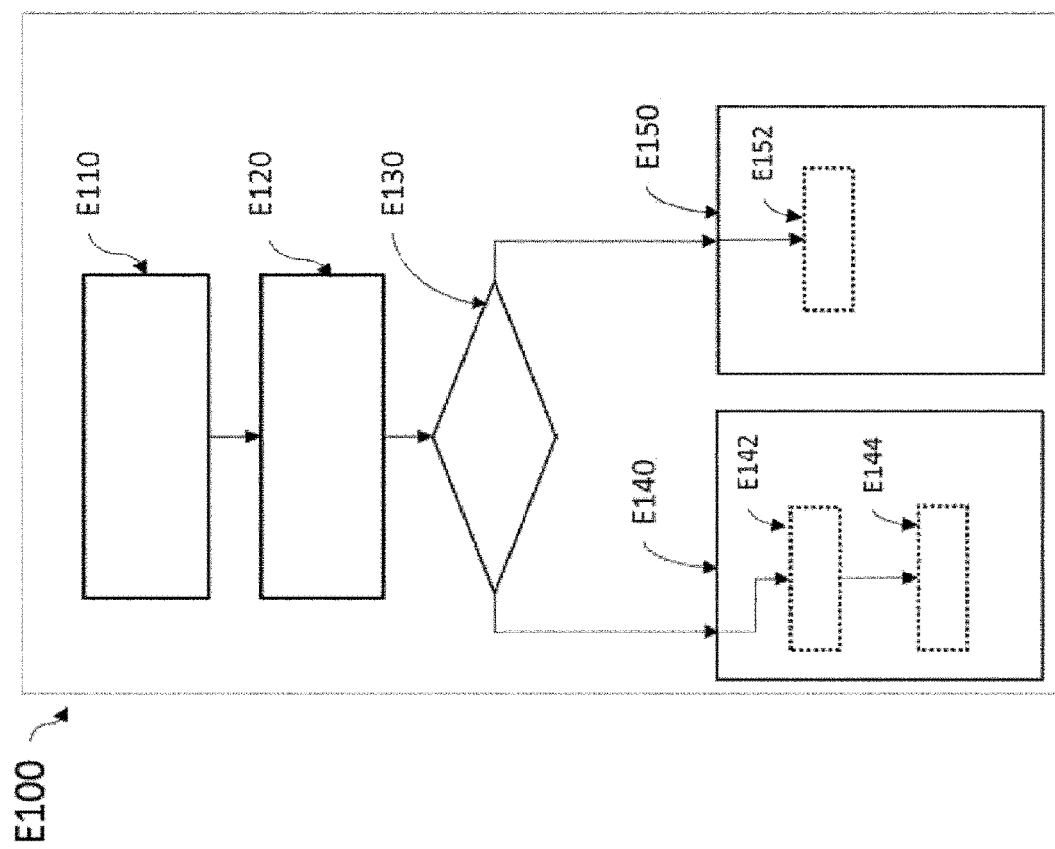

FIG. 4 schematically represents an incoming processing step of the data packet routing method, according to an embodiment of the invention.

Figure 5:
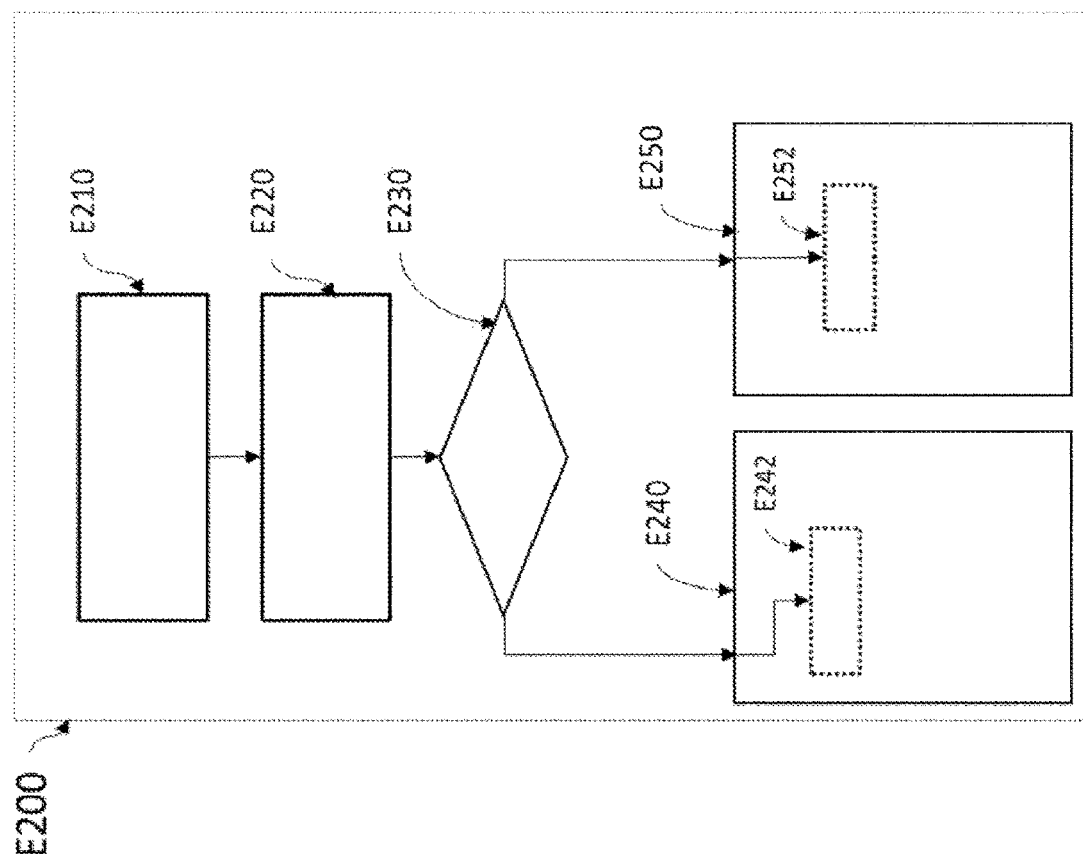

FIG. 5 schematically represents an outgoing processing step of the data packet routing method, according to an embodiment of the invention.

In FIG. 1, there is schematically represented wireless communications equipment ES able to implement the invention. This equipment ES, for example a multimedia management system of a vehicle, is connected to two wide area telecommunications networks NTW1, NTW2.

The communications equipment ES comprises a multimedia system IVI, two electronic control units ECU1, ECU2 to provide application services and a communications system IVC, which are connected via a first interface IF1. The multimedia system IVI is itself equivalent to a control unit in this application since it incorporates a computer.

The communications system IVC has a radiofrequency modem MDM, for example a GPRS, UMTS and LTE multimode modem, enabling the connection of the communications system IVC, and through it, the electronic control units IVI, ECU1, ECU2 to the wide area telecommunications networks NTW1, NTW2.

The electronic control units IVI, ECU1, ECU2 access the wide area telecommunications networks via access points APN1, APN2. Each access point can be of the secure type if the data transiting through this access point is considered not to pose a security risk for the IT system, or of the non-secure type otherwise. Each access point is associated with an electronic control unit and vice versa.

The radiofrequency modem MDM is connected to the communications system IVC via an interface IF2.

The communications system IVC also comprises a processor P, memories MEMp, MEMd, to store computer programs and data, and specialized circuits ETH, I, providing connection to the communication interfaces IF1, IF2 respectively. The wireless communications equipment ES also comprises specialized means, which can in certain embodiments be implemented by electronic circuits cooperating with software modules which use the processor P and the memories MEMp, MEMd:
first reception means, IF1, ETH, P, MEMp, MEMd, for receiving from one of the electronic control units IVI, ECU1, ECU2, referred to as source unit, an outgoing packet;

identification means for identifying an access point APN1, APN2, corresponding to the electronic source unit IVI, ECU1, ECU2, referred to as transmission access point;

second reception means IF2, I, P, MEMp, MEMd, for receiving from the modem MDM an incoming packet and an identifier of an access point APN1, APN2 via which said incoming packet has been received by the modem MDM from said telecommunications network NTW1, NTW2, referred to as reception access point;

determination means P, MEMp, MEMd, for determining a type for the transmission access point and/or reception access point;

means P, MEMp, MEMd, I, ETH for transferring and means P, MEMp, MEMd for internally processing incoming packets and outgoing packets, as a function of the reception access point type, respectively the transmission access point type, as will be explained hereafter.

FIG. 2 schematically represents elements of the architecture of the communications equipment ES, highlighting functional modules involved and data paths implemented.

By way of example, only one electronic control unit, IVI, is represented.

The data packets transmitted by an electronic control unit IVI, to a wide area network NTW1, NTW2, are sent by the transmitting electronic control unit IVI, via the first interface IF1 to the communications system IVC, which routes them via the second interface IF2 to the radiofrequency modem MDM, for transmission to the recipient wide area network NTW1, NTW2.

Similarly, the data packets coming from a wide area network NTW1, NTW2, and going to an electronic control unit IVI, ECU1, ECU2, are received by the radiofrequency modem MDM, and then transmitted to the communications system IVC via the second interface IF2, for routing to the recipient electronic unit.

The communications system IVC implements "interface driver" modules for controlling interfaces IF1, IF2. In the example illustrated, the first interface IF1 is an Ethernet interface, controlled by the "IF1 driver" module, and the second interface IF2 is a shared memory interface, controlled by the "MDM driver" module.

To communicate with the telecommunications networks NTW1, NTW2, the radiofrequency modem MDM implements an IP cellular packet transport protocol, namely the protocol "PDP", an abbreviation for "Packet Data Protocol". In accordance with this PDP protocol, the modem MDM defines data structures, of the type referred to as "PDP context" and used to process and route data streams in the telecommunications networks NTW1, NTW2. The modem MDM sets out a PDP context structure for each access point used. Thus, by virtue of using the PDP protocol and PDP context data structures, the access point via which a data packet is received by the modem MDM can be identified.

As already mentioned, each access point APN1, APN2, is associated with an electronic control unit IVI, ECU1, ECU2. This association can be determined by the services provided to a user of the communications equipment ES. For example, the IVI must have a connection to the Internet network NTW2 considered to be non-secure. The IVI also requires a connection to the internal network of the vehicle manufacturer, NTW1, considered to be secure, for which the IVC uses an address translation module, NAT, to share this secure connection with the control unit IVI.

In certain embodiments, the associations between the access points APN1, APN2, . . . , APNi and the electronic control units IVI, ECU1, ECU2, . . . , ECUj are one-to-one.

In other embodiments, an electronic control unit, ECUk, can share its connection with the communications system IVC with other electronic control units ECUk1, ECUk2, ECUkn, in order to enable the latter to access non-secure access points APNk1, APNk2, . . . , APNkn. In that case, all the packets intended for the electronic control units ECUk1, ECUk2, ECUkn, will be transferred by the communications system IVC to the electronic control unit ECUk. The latter can then manage the addressing of the packets to the electronic control units ECUk1, ECUk2, ECUkn, according to known techniques, for example address translation mechanisms.

In both cases, the data packet routing method according to the invention ensures the transfer of packets from or to a non-secure access point without involving the TCP/IP layer of the protocol stack implemented by the communications system IVC, thus allowing the user access to services provided via these non-secure access points, without exposing the communications system IVC to non-secure data streams.

Hereafter in this document, data packets coming from an electronic control unit are called "outgoing packets" and data packets going to an electronic control unit are called "incoming packets". The processing operations applied by the communications system IVC to the incoming, respectively outgoing, data packets are referred to as "incoming processing", respectively "outgoing processing" operations.

The routing method implemented by the communications system IVC comprises, as illustrated in FIG. 3, an incoming processing step E100 and/or an outgoing processing step E200.

The incoming processing step E100 according to one embodiment of the invention will now be detailed with reference to FIGS. 2 and 4.

When an incoming packet is being received from a telecommunications network NTW1, NTW2, the modem MDM identifies, by virtue of the PDP protocol and the PDP context data structures, the access point via which this data packet has been received. The identifier of this access point is transmitted, with the received data packet, to the communications system IVC, via the second interface IF2.

The communications system IVC receives, during a first reception step E110, via the second interface IF2, the incoming packet and the identifier of the reception access point APN1, APN2. These items of information are processed by the "MDM driver".

Then, during a first determination step E120, the type for the reception access point is determined. When the IVC requests the modem to set up a connection to a given APN (identifying a network NTW1), the IVC indicates on which logical channel of IF2 it desires to be able to receive and transmit data for this connection. It is the APN/logical channel association which enables the IVC to determine whether data belongs to a network NTW1 or NTW2.

Let us first assume that the incoming packet is received from the network NTW2 via the access point APN2 of the non-secure type.

Following execution of step E120, it is therefore determined that the reception access point is of the non-secure type.

In that case, the communications system IVC executes a first identification step E130 for identifying the electronic control unit, IVI, corresponding to the reception access point, referred to as recipient unit.

Then, a first transfer step E140 for transferring said incoming packet to the recipient unit IVI is executed. During this step, the transfer is performed at a data link layer of the TCP/IP protocol stack of the IVC communications system, without involving the TCP/IP layer. In other words, the transfer is carried out without network layer intervention, by modifying only the encapsulation of the IP packets, without performing a data recopy, or "memcopy", and without analyzing the format and content of the packets.

Only the start and end fields of the frames transmitted by the driver managing the PDP protocol layer, "MDM driver", are removed and replaced by fields specific to the data link layer of the first interface IF1 during a substep E142.

In certain embodiments, the first transfer step E140 comprises a first substep E144 confirming acceptance of said incoming packet. This confirmation can be used by the driver managing the PDP protocol layer, "MDM driver", in a manner similar to acceptance confirmations transmitted by the TCP/IP layer during conventional processing of data.

The transfer carried out during step E140 uses the first interface IF1, which in the example illustrated in FIG. 2 is an Ethernet interface. The IP packets received from the driver managing the PDP protocol layer, "MDM driver", are in this case encapsulated in Ethernet frames by the addition of fields specific to this protocol. The "destination address" field will be filled with the address allocated to the recipient unit IVI in the Ethernet local area network formed within the communications equipment ES.

The Ethernet frames and the IP packets contained in these frames are then processed conventionally by the TCP/IP protocol stack of the recipient unit IVI, and the application data is supplied to the application APP2.

Of course, other interfaces can be used for implementing the first interface IF1, for example USB interfaces or CAN data buses.

The data path implemented for a packet received via an access point of the non-secure type is represented by the dotted line in FIG. 2.

Let us now assume that the incoming packet is received from the network NTW1 via the access point APN1 of the secure type. Following execution of step E120, it is therefore determined that the reception access point is of the secure type.

In this case, the communications system IVC executes a first internal processing step E150. The incoming packet is processed by a TCP/IP telecommunications protocol stack executed by the communications system IVC. It is to be noted that the final application APP1, APP1' can be executed by the application layer of the communications system IVC itself or by the application layer of an electronic control unit IVI, ECU1, ECU2. In the latter case, the communications system IVC shares the secure access with the other electronic control units, according to address translation techniques NAT involving the TCP/IP layer. As the access point APN1 is of the secure type, the internal processing by the TCP/IP protocol stack executed by the communications system IVC preserves the security of the system.

The data paths implemented for packets received via the secure access point APN1, and intended to be used by the applications APP1, APP1', executed by the communications system IVC and by the electronic control unit IVI respectively, are represented by the solid lines in FIG. 2.

The outgoing processing step E200 according to one embodiment of the invention will now be detailed with reference to FIG. 5.

The communications system IVC receives, during a second reception step E210, via the first interface, IF1, an outgoing packet from an electronic control unit, IVI, ECU1, ECU2, referred to as source unit.

Then, during a second identification step E220, an access point APN1, APN2, corresponding to the electronic source unit IVI, ECU1, ECU2, referred to as transmission access point, is identified.

The type for the transmission access point APN1, APN2 is determined during a second determination step E230.

If the transmission access point APN2 is of the non-secure type, then a second transfer step E240 is executed for transferring the outgoing packet and an identifier of the transmission access point APN1, APN2 to the modem MDM. This transfer is performed at a data link layer of a TCP/IP protocol stack, via the second interface IF2, without involving the TCP/IP layer of said stack. As in the case of the incoming processing step E100, the transfer is carried out without network layer intervention, by modifying only the encapsulation of the IP packets, without performing a data recopy, or "memcopy", and without analyzing the format and content of the packets.

Only the start and end fields of the frames transmitted by the data link layer of the first interface are removed and replaced by the fields specific to the PDP protocol layer. Thus, the communications system IVC is not exposed to non-secure data streams.

The data path implemented for sending a packet via an access point of the non-secure type is represented by the dotted line in FIG. 2.

If, following execution of the second determination step E230, the outcome is that the transmission access point is of the secure type, for example in the access point APN1, there follows a second internal processing step E250 for the outgoing packet, by a TCP/IP telecommunications protocol stack executed by the communications system IVC. As in the case of the incoming processing step, the internal processing carried out during the outgoing processing step concerns only secure data streams.

The data paths implemented for sending packets via the secure access point APN1, from the applications APP1, APP1', and executed by the communications system IVC and by the electronic control unit IVI respectively, are represented by the solid lines in FIG. 2. Conventionally, the communications system IVC shares the secure access with the other electronic control units, according to address translation techniques NAT involving the TCP/IP layer. As the access point APN1 is of the secure type, the internal processing by the TCP/IP protocol stack executed by the communications system IVC preserves the security of the system.

In a preferred embodiment, the first interface IF1 comprises a data transmission physical layer and a plurality of logical layers. This configuration provides for implementing
- at least a part of a secure virtual network V1 comprising an access point to services on an electronic control unit IVI, ECU1, ECU2, and the secure access point APN1; and
- a point-to-point local area network V2 implementing a data link layer L2 between the electronic control unit IVI, ECU1, ECU2 and the communications system IVC.

It will be understood that various modifications and improvements that are obvious to a person skilled in the art can be brought to the various embodiments of the invention which are described in the present description, without departing from the scope of the invention, which scope is defined by the appended claims.

The invention claimed is:

1. A method for routing data packets from or to at least one electronic control unit, referred to as outgoing packets, respectively incoming packets, said at least one electronic control unit being connected to a communications system via a first interface, said communications system being connected via a second interface to a modem configured to transfer said outgoing packets and said incoming packets to, respectively from, at least one telecommunications network via a plurality of access points, each access point being secure or non-secure, and being associated with an electronic control unit, the method being executed by the communications system and comprising:
   incoming processing; and/or
   outgoing processing,
   in which the incoming processing comprises:
      first receiving, via the second interface, an incoming packet and an identifier of an access point via which said incoming packet has been received by the modem from said telecommunications network, referred to as reception access point;
      first determining a type for the reception access point;
      when said reception access point is of the non-secure type,
         first identifying an electronic control unit corresponding to the reception access point, referred to as recipient unit; and
         first transferring said incoming packet to the recipient unit at a data link layer of a TCP/IP protocol stack, via the first interface, without involving a TCP/IP layer; and
      when said reception access point is of the secure type,
         first processing of said incoming packet by a TCP/IP telecommunications protocol stack executed by the communications system; and
   in which the outgoing processing comprises:
      second receiving, via the first interface, an outgoing packet from an electronic control unit, referred to as source unit;
      second identifying an access point corresponding to the electronic source unit, referred to as transmission access point;
      second determining a type for the transmission access point;
      when said transmission access point is of the non-secure type, second transferring said outgoing packet and an identifier of said transmission access point at a data link layer of a TCP/IP protocol stack, to the modem, via the second interface, without involving the TCP/IP layer of said stack; and
      when said transmission access point is of the secure type, second processing of said outgoing packet by a TCP/IP telecommunications protocol stack executed by the communications system.

2. The routing method as claimed in claim 1, in which the first interface comprises a data transmission physical layer and a plurality of logic layers to implement at least a part of a secure virtual network comprising a secure access point, and to implement a point-to-point local area network implementing a data link layer between said at least one electronic control unit and said communications system; and
in which
   the first transferring comprises adding a first header, in accordance with the data link layer, to said incoming packet; and/or
   the second transferring comprises adding a second header, in accordance with the data link protocol between said communications system and said modem, to said outgoing packet.

3. The routing method as claimed in claim 1, in which the first transferring comprises confirming acceptance of said incoming packet.

4. The routing method as claimed in claim 1, in which:
   the at least one telecommunications network is a communication network with mobile communication equipment;
   the first processing and/or the second processing comprises address translation between the at least one telecommunications network and the part of the secure virtual network; and
   the first interface is an Ethernet interface.

5. A non-transitory computer readable medium storing a program that, when executed by a computer, causes the computer to execute the routing method as claimed in claim 1.

6. A communications system configured to be connected
   via a first interface to at least one electronic control unit; and
   via a second interface to a modem configured to transfer data packets from or to said at least one electronic control unit, referred to as outgoing packets, respectively incoming packets, to, respectively from, at least one telecommunications network via a plurality of access points, each access point being of the secure or non-secure type, and being associated with an electronic control unit;
said communications system additionally comprising:
   first reception means for receiving from said at least one electronic control unit, referred to as source unit, an outgoing packet;
   identification means for identifying an access point corresponding to the electronic source unit, referred to as transmission access point;
   second reception means for receiving from the modem an incoming packet and an identifier of an access point via which said incoming packet has been received by the modem from said telecommunications network, referred to as reception access point;
   determination means for determining a type for the transmission access point and/or reception access point;
   transfer means for transferring at a link layer of a TCP/IP protocol stack, without involving a TCP/IP layer of said stack,
      said outgoing packet and the identifier of said transmission access point to the modem when the transmission access point type is non-secure, and
      said incoming packet to the recipient unit when the reception access point type is non-secure; and
   internal processing means for the processing of said incoming packet and/or said outgoing packet by a TCP/IP telecommunications protocol stack, when the reception access point type is secure.

7. Mobile communications equipment, comprising:
   the communications system as claimed in claim 6; and
   the at least one electronic control unit, which is connected via a first interface of the Ethernet, USB or CAN type.

8. A vehicle, comprising:
   the mobile communications equipment as claimed in claim 7.

* * * * *